United States Patent
Aoki (10) Patent No.: US 10,686,946 B2
(45) Date of Patent: Jun. 16, 2020

(54) INTERMEDIARY DEVICE, DEVICE MONITORING SYSTEM, AND INTERMEDIATION METHOD (71) Applicant: Satoshi Aoki, Kanagawa (JP)

(72) Inventor: Satoshi Aoki, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/268,770

(22) Filed: Feb. 6, 2019

(65) Prior Publication Data
US 2019/0289137 A1 Sep. 19, 2019

(30) Foreign Application Priority Data

Mar. 19, 2018 (JP) .................... 2018-051523

(51) Int. Cl.
G06F 3/12 (2006.01)
H04N 1/00 (2006.01)
H04N 1/32 (2006.01)
H04L 29/08 (2006.01)

(52) U.S. Cl.
CPC ....... *H04N 1/00029* (2013.01); *H04L 67/125* (2013.01); *H04N 1/00037* (2013.01); *H04N 1/00042* (2013.01); *H04N 1/00079* (2013.01); *H04N 1/00084* (2013.01); *H04N 1/00344* (2013.01); *H04N 1/32662* (2013.01); *H04N 1/00204* (2013.01); *H04N 2201/0039* (2013.01)

(58) Field of Classification Search
CPC ........... H04N 1/00029; H04N 1/00037; H04N 1/00084; H04N 1/00042; H04N 1/00079; H04N 1/00344; H04N 1/32662; H04N 1/32667; H04N 1/00204; H04N 2201/0039; H04L 67/125
See application file for complete search history.

(56) References Cited

U.S. PATENT DOCUMENTS

2016/0337169 A1* 11/2016 Chhabra ............. H04L 41/0672
2017/0063605 A1*  3/2017 Cheng ................ H04L 41/0668
2017/0171415 A1*  6/2017 Kubokura .......... H04N 1/00204
2018/0357120 A1* 12/2018 Borlick ............... G06F 11/1415

FOREIGN PATENT DOCUMENTS

JP    2008-227671    9/2008
JP    2017-173944    9/2017

* cited by examiner

*Primary Examiner* — Moustapha Diaby
(74) *Attorney, Agent, or Firm* — Harness, Dickey & Pierce, P.L.C.

(57) ABSTRACT

An intermediary device includes circuitry to: transmit, to a server, device information on a device to be monitored acquired from the device via a network; monitor a state of another intermediary device, the another intermediary device being configured to acquire from another device to be monitored device information on the another device and transmit the acquired device information to the information processor; and take over monitoring of the another device, which the another intermediary device kept monitoring, based on setting information for monitoring the another device monitored by the another intermediary device, when the state of the another intermediary device indicates that the another intermediary device has an abnormality.

14 Claims, 8 Drawing Sheets

FIG. 7

INTERMEDIARY DEVICE, DEVICE MONITORING SYSTEM, AND INTERMEDIATION METHOD

CROSS-REFERENCE TO RELATED APPLICATIONS

This patent application is based on and claims priority pursuant to 35 U.S.C. § 119(a) to Japanese Patent Application No. 2018-051523, filed on Mar. 19, 2018, in the Japan Patent Office, the entire disclosure of which is hereby incorporated by reference herein.

BACKGROUND

Technical Field

The present invention relates to an intermediary device, a device monitoring system, and an intermediation method.

Description of the Related Art

A system for monitoring the status of various devices connected to a network is known. For example, the resident number of threads, and counter information or the like on the number of printed sheets are transmitted from a multifunction peripheral to a cloud server (ultimately transmitted to an application system or the like which monitors the multifunction peripheral), and are used for detecting abnormality, accounting, and the like. The cloud server may also monitor the state whether an industrial machine, a medical device, or the like, is operating properly. Further, in recent years, attempts have also been made to monitor or control the devices from the cloud server by attaching a sensor (with a communication device), such as a camera, to a physical object (which may also be referred to as a "thing") that is not connectable to a network. Communication of such "things" is called the Internet of Things (IOT).

However, when the device is directly connected to a cloud server on the Internet, each device needs to have a communication function with the cloud server and a function of ensuring security of the communication. Providing such functions increases cost. Also, devices or sensors (communication devices) having difficulty in making such adaption may exist.

Therefore, measures may be taken to install an intermediary device, which mediates communication with a cloud server, in a Local Area Network (LAN) where the device is located. Since the intermediary device collectively carries out processes related to communication with the cloud server and security, the cost of each device or sensor (communication device) can be reduced.

However, when the intermediary device goes down (i.e., when a failure, a firmware update, or reboot processing occurs), inconvenience, more specifically, communication between the device and the cloud server is delayed or disrupted, is caused.

SUMMARY

Example embodiments of the present invention include an intermediary device including circuitry to: transmit, to a server, device information on a device to be monitored acquired from the device via a network; monitor a state of another intermediary device, the another intermediary device being configured to acquire from another device to be monitored device information on the another device and transmit the acquired device information to the information processor; and take over monitoring of the another device, which the another intermediary device kept monitoring, based on setting information for monitoring the another device monitored by the another intermediary device, when the state of the another intermediary device indicates that the another intermediary device has an abnormality.

Example embodiments include a device monitoring system including a plurality of intermediary devices as described above, and an intermediation method performed by the intermediary device.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, as an example of a mode for carrying out the present invention, a device monitoring system, an intermediary device, and an intermediation method performed by the intermediary device is described with reference to the drawings.

<Outline of Operation>

The device monitoring system of the present embodiment includes a plurality of intermediary devices to deal with the possibility of temporary suspension of the intermediary device installed in the local area network due to a failure, a firm update, or reboot. The plurality of intermediary devices monitor the statuses of the intermediary devices mutually while mediating communication between the cloud server and the devices, respectively.

Figure 1A:
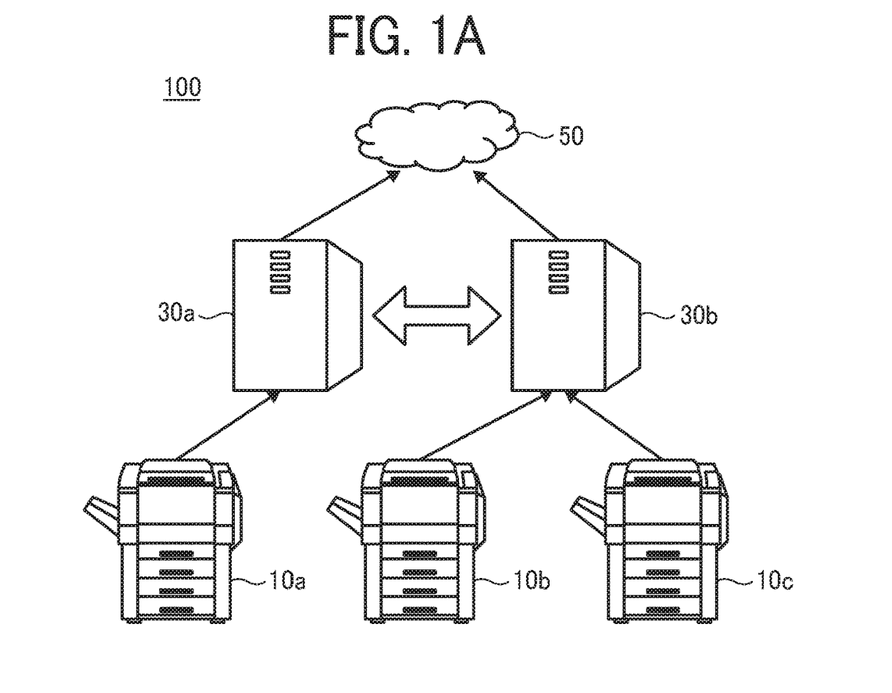
FIGS. 1A and 1B are examples of a view for explaining an outline of an operation of a device monitoring system according to an embodiment of the present invention.
Figure 1B:
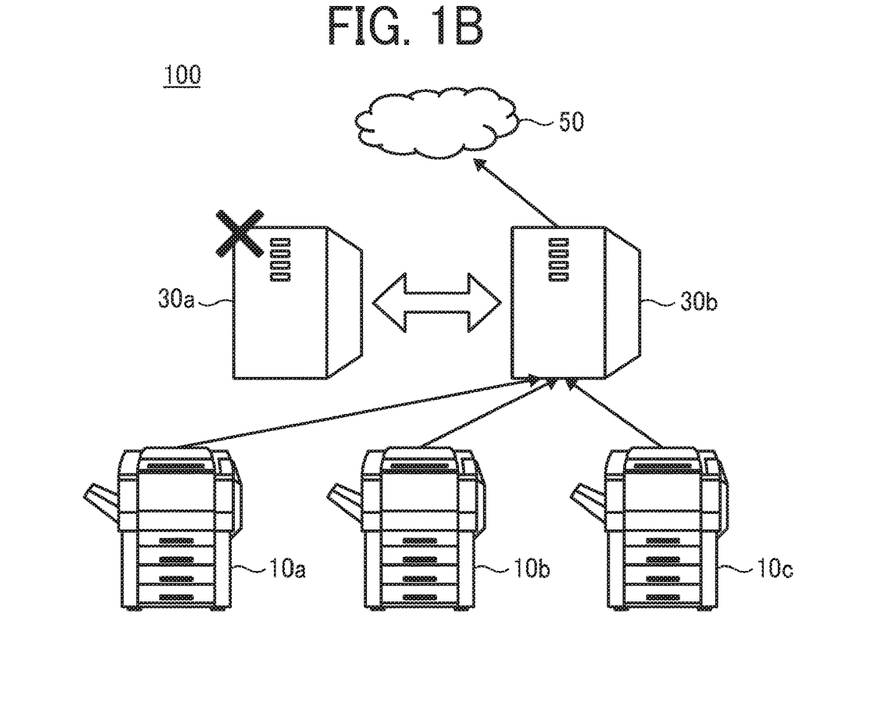

FIGS. 1A and 1B are examples of a view for explaining an outline of an operation of a device monitoring system 100 according to an embodiment of the present invention. First, FIG. 1A is described.

(1) An intermediary device 30a mediates communication between a device 10a and a cloud server 50, and an intermediary device 30b mediates communication between devices 10b and 10c and the cloud server 50.

(2) Further, the intermediary device 30a monitors the state of the intermediary device 30b, and the intermediary device 30b monitors the state of the intermediary device 30a.

A case where the intermediary device 30a is stopped is described with reference to FIG. 1B.

(3) The intermediary device 30b detects that the intermediary device 30a has stopped.

(4) The intermediary device 30b acquires information necessary for monitoring the device 10a for which the intermediary device 30a mediated communication (or obtains the information before the intermediary device 30a stops), and mediates communication between the device 10a and the cloud server 50 using information necessary for monitoring the device 10a.

Therefore, when the intermediary device 30a is stopped, the intermediary device 30b takes over the intermediary position. Thus, stability and availability of communication between the device 10a and the cloud server 50 can be improved.

A device to be monitored may be any as long as some information for monitoring of the device can be acquired. In addition, processing based on the acquired information may or may not be performed. Monitoring may be referred to as observation or management. Further, the device may be referred to as an apparatus, a machine, a meter, an instrument (tool), an engine, an electronic device, a facility, or the like.

Device information on the device may be any information that is acquired or may be acquired from the device. The state of the intermediary device is a condition in which the intermediary device is at a certain time. For example, the state includes an internal state such as memory usage, but a physical state such as the temperature and posture may also be included.

Abnormality refers to a state different from ordinary. In other words, abnormality may be referred to as a different state. Intermediation is intended as achieving convenience for two sides, and more specifically, providing mediation of information communication, for example. Not limited to transfer of information without making any change, the transfer may be carried out with some processing added. The intermediary device may alternatively referred to as a relay device.

Taking over means inheriting the processing. Not only performing exactly the same processing as the one performed before, but inheriting only part of the processing is included in the context of taking over.

<System Configuration Example>

Figure 2:
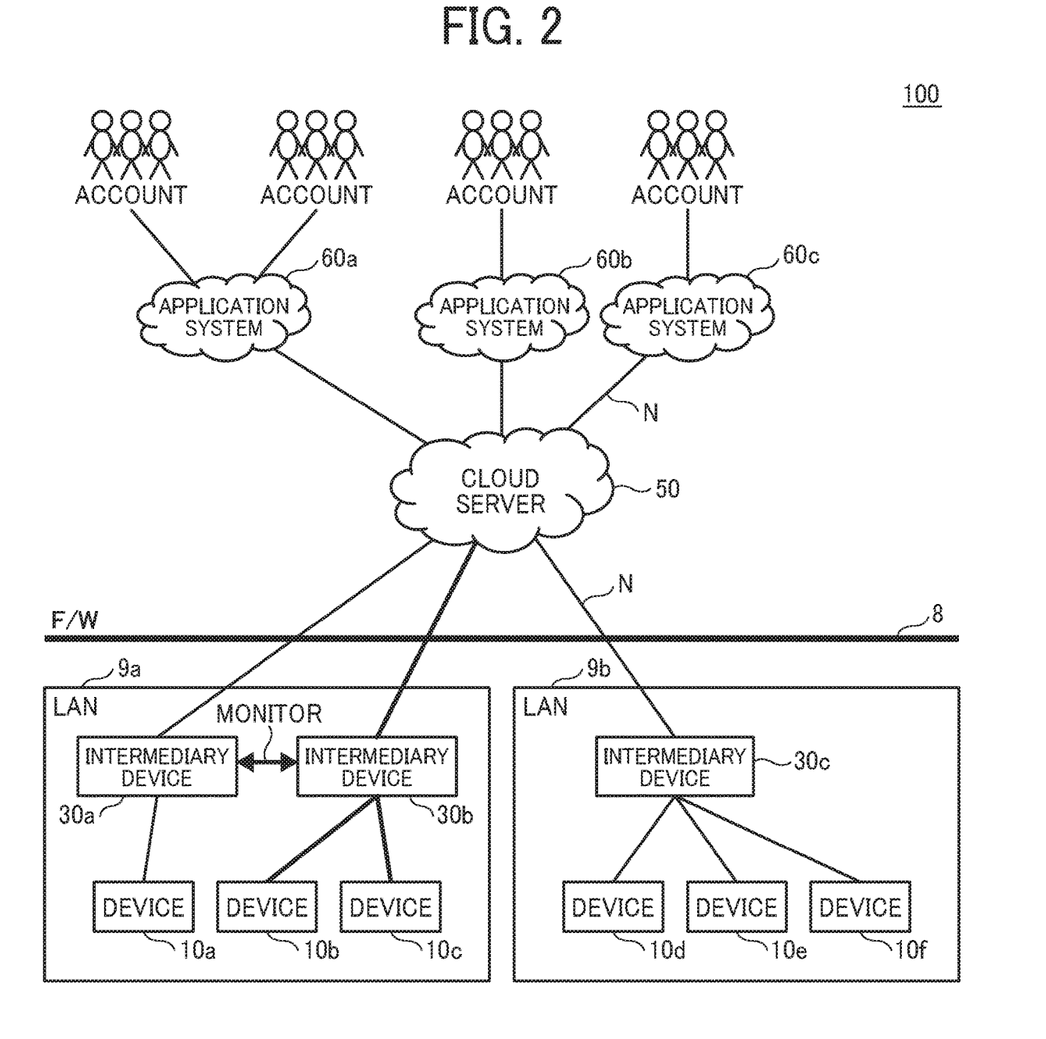
FIG. 2 is a schematic view for explaining a schematic configuration of the device monitoring system according to the present embodiment.

FIG. 2 is a schematic diagram for explaining a schematic configuration of the device monitoring system 100 according to the present embodiment. The device monitoring system 100 includes a plurality of devices 10 (10a to 10f), a plurality of intermediary devices 30 (30a to 30c), the cloud server 50, and at least one application system 60 (60a to 60c). The intermediary device 30 and the application system 60 are connected to the cloud server 50 via a network N such as the Internet.

Further, the intermediary device 30 and the device 10 are connected to a LAN 9 (9a, 9b), and a firewall 8 is provided between the LAN 9 and the cloud server 50. Although FIG. 2 depicts a plurality of LANs 9, a single LAN 9 may be used. Further, a plurality of LANs 9 may be laid in one facility (an enterprise, etc.), or the LAN 9 may be installed for each facility. In the LAN 9a, two intermediary devices 30a and 30b are arranged, and three devices 10a to 10c are arranged. In the LAN 9b, one intermediary device 30c is arranged, and three devices 10d to 10f are arranged. However, the arrangement illustrated is merely an example. In the present embodiment, explanation is given assuming the LAN 9a in which a plurality of intermediary devices 30a and 30b are included.

The firewall 8 is a device that monitors data flowing at a boundary between the LAN 9a or 9b where the intermediary device 30 resides and the outside in order to prevent unauthorized acts by a third party who has entered the intermediary device 30 through the network such as the Internet, and detects and shut down such unauthorized access.

The device 10 is a device to be monitored by the cloud server 50. If a device is one which needs maintenance or counter reading, the device may be the device 10 of the present embodiment. For example, a multifunction peripheral, a projector, an electronic blackboard, and a video conference terminal may represent the device 10.

For example, the multifunction peripheral is described. The multifunction peripheral has at least two or more of various functions such as a printer function, a copy function, a facsimile function, a scanner function, and the like. The multifunction peripheral is also called MFP (Multi Function Peripherals), or AIO (All-in-One). Further, the multifunction peripheral of the present embodiment may be a device such as a printer having only one of a plurality of functions. For example, the multifunction peripheral may be an image forming apparatus, a printing apparatus, a scanner apparatus, a facsimile apparatus, or the like.

When the device 10 of the present embodiment has received periodic acquisition request for device information from the intermediary device 30, the device 10 transmits supply status information, jam information, counter information, application version information, error information, device setting information, etc., to the intermediary device 30.

Further, the device 10 may be a physical object ("thing"), such as a human sensor, not originally equipped with a network function. By providing a communication device of low functionality such as ZigBee (registered trademark) in the human sensor, various "things" can be monitored by the device monitoring system 100.

The intermediary device 30 is installed in the LAN 9 protected by the firewall 8, and is an information processing apparatus that mediates communication between the device 10 and the cloud server 50. For example, the intermediary device 30 accesses the device 10 in receiving an instruction from the cloud server 50, or notifies the cloud server 50 of an alert notification (abnormality notification) from the device 10. Also, the intermediary device 30 acquires device information of the device 10, and monitors whether the device 10 is active, on the basis of preset schedule information. A plurality of intermediary devices 30 may be installed in the LAN 9, in which case the intermediary devices 30 monitor the statuses of each other and continue to provide services.

A specific example of the intermediary device 30 may be a general information processing apparatus, such as a personal computer (PC), a server device, or the like. In addition, one of the devices 10 may provide the function as the intermediary device 30.

The cloud server 50 holds communication path information of the application system 60, the intermediary device 30, and the device 10 (i.e., association of the system and devices) in a database, and supports bidirectional communication between the application system 60 and the device 10. Therefore, the application system 60 can communicate with the device 10 used for the application system 60.

The cloud server 50 is adaptable to cloud computing. The cloud computing is a mode of usage in which resources on the network are used without taking heed of specific hardware resources.

The application system 60 provides individual services (solutions) by using means of access to the device 10 provided by the cloud server 50. For example, a log collection service, a counter collection service, or a maintenance service of the device 10, is given as the specifics of the service. An account is registered in the application system 60, and a service provider authenticated by account information (ID and password) provides the above service.

An example of the service provider is a customer engineer.

Preferably, the application system 60 can be adaptable to the cloud computing.

<Example of Hardware Configuration>
<<Intermediary Device>>

Figure 3:
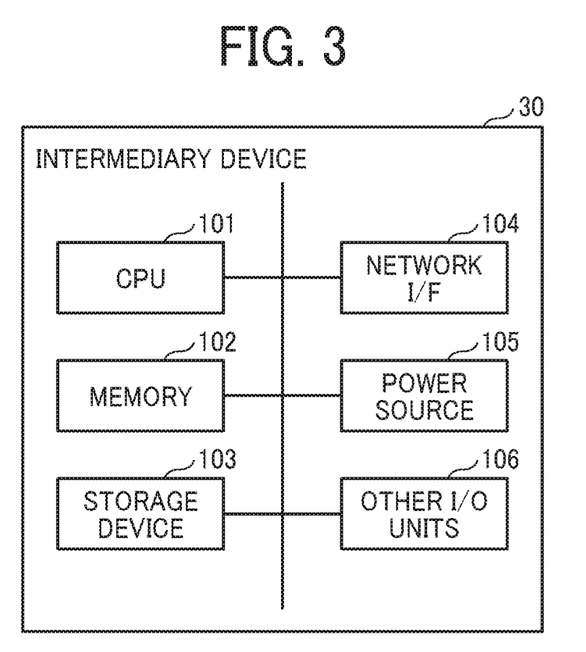
FIG. 3 is a diagram illustrating an example of a hardware configuration of an intermediary device.

FIG. 3 is a diagram illustrating an example of the hardware configuration of the intermediary device 30. The intermediary device 30 includes hardware elements, which are a CPU 101, a memory 102, a storage device 103, a network interface (I/F) 104, a power source 105, and the other I/O units 106.

The CPU 101 is an abbreviation for a central processing unit, and performs overall control of the intermediary device 30 related to device monitoring, such as communication with the cloud server 50 and the device 10. The memory 102 is a main storage device that provides a temporary storage area for the CPU 101 to perform the above process. The main storage device is volatile, and data on the memory is lost when power is turned off.

The storage device 103 is a nonvolatile storage area for storing data to be saved even when the power is turned off. Generally, SD cards, HDDs, SSDs, etc., are known, but a method of realizing the storage is not limited to the above. The network I/F 104 provides a physical communication interface for communicating with the cloud server 50 and the device 10. For example, a LAN port may be employed when performing wired communication, and Wi-Fi, 3G, LTE, 4G, 5G, Zigbee, EnOcean, or Bluetooth Low Energy (registered trademark) may be employed when performing wireless communication.

The power source 105 is a power supply for driving the intermediary device 30, and electric power is supplied from a receptacle outlet using an AC adapter or the like. The other I/O units 106 are various input/output interfaces such as a USB, a hardware key (button), an LED for notifying the state of the intermediary device 30, and a liquid crystal display.

It is assumed that the hardware configuration of the application system 60 and the cloud server 50 implements the function of the information processing apparatus similarly to the intermediary device 30 illustrated in FIG. 3. Alternatively, even if the hardware configuration is different from the hardware configuration of the intermediary device 30, the difference is considered to be negligible in the explanation of the present embodiment.

<<Device>>

Figure 4:
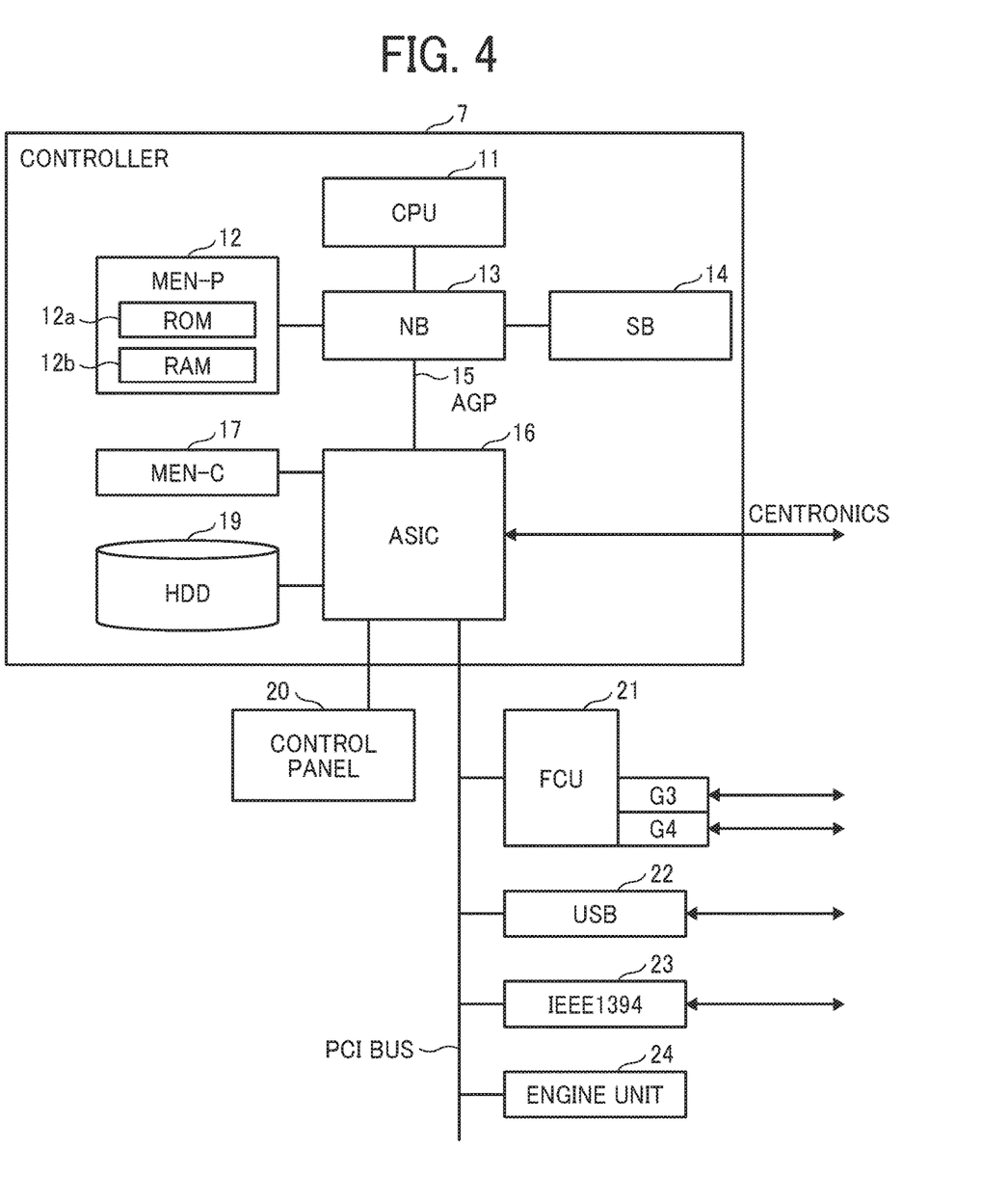
FIG. 4 is a diagram illustrating an example of a hardware configuration of a multifunction peripheral.

An example of a hardware configuration of the multifunction peripheral is described as an example of the device 10 with reference to FIG. 4. FIG. 4 is a diagram illustrating an example of the hardware configuration of the multifunction peripheral. The multifunction peripheral is configured mainly by a controller 7, a control panel 20, and an engine unit 24. The controller 7 and the engine unit 24 are coupled via a peripheral component interface (PCI) bus, and the controller 7 and the control panel 20 are coupled via a predetermined signal line.

The controller 7 performs control of the entire multifunction peripheral, more specifically, performs control of various kinds of processing such as rendering processing, communication processing, operation input on the control panel 20, and display processing. In the present embodiment, the controller 7 includes a CPU 11, a system memory (MEM-P) 12, a Northbridge (NB) 13, a Southbridge (SB) 14, an application specific integrated circuit (ASIC) 16, a local memory (MEM-C) 17, a hard disk drive (HDD) 19, etc.

The Northbridge (NB) 13 and the ASIC 16 are coupled via an accelerated graphics port (AGP) bus 15, and the MEM-P 12 includes a read-only memory (ROM) 12a and a random-access memory (RAM) 12b.

The CPU 11 comprehensively controls the entire multifunction peripheral, and is coupled to another device 10 via a chip set including the MEM-P 12, the NB 13, and the SB 14.

The MEM-P 12 is a system memory used as a memory for storing and developing programs and data, a memory for rendering by a printer, and the like. It should be noted that the ROM 12a is a read-only memory used as a memory for storing programs and data, and the RAM 12b is a memory for developing programs and data, and a write/read memory used as a memory for rendering by the printer, for example.

The NB 13 is a bridge for coupling the CPU 11, the MEM-P 12, the SB 14, the ASIC 16, and the like, and includes a memory controller for controlling reading of the MEM-P 12 and writing to the same, a PCI master, and an AP target.

The SB 14 is a bridge for coupling the NB 13 to PCI devices, peripheral devices, and the like. The SB 14 is coupled to the NB 13 via the PCI bus, and a network interface (I/F) unit or the like is also coupled to the PCI bus.

The AGP bus 15 is a bus interface for a graphics accelerator card proposed for increasing the speed of a graphics operation. By directly accessing the MEM-P 12 with high throughput, a speed of the graphics accelerator card can be increased.

The ASIC 16 is an integrated circuit (IC) for image processing having a hardware element for image processing, and functions as a bridge connecting the AGP 15, the PCI bus, the HDD 19, and the MEM-C 17.

Also, the ASIC 16 includes a PCI target, an AGP master, an arbiter (ARB) forming the core of the ASIC 16, a memory controller for controlling the MEM-C 17, a plurality of direct memory access controllers (DMACs) which perform rotation of image data by a hardware logic, etc., and a PCI unit for transferring data to and from the engine unit 24 via the PCI bus, and the like.

Further, a facsimile control unit (FCU) 21, a universal serial bus (USB) 22, and an IEEE 1394 (Institute of Electrical and Electronics Engineers 1394) interface 23 are coupled to the ASIC 16 via the PCI bus, and the control panel 20 is coupled to the ASIC 16 via a signal line.

The MEM-C 17 is a local memory used as a copy image buffer, a code buffer, and the like. The hard disk drive (HDD) 19 is a storage device for storing image data, programs, font data, forms, and the like.

The control panel 20 is implemented by a push button, a touch panel, and the like. The touch panel displays an operation method and a function button for using various functions of the multifunction peripheral corresponding to the device. The control panel 20 is also a user interface for accepting operation inputs from the user via the function button.

<Function>

Figure 5:
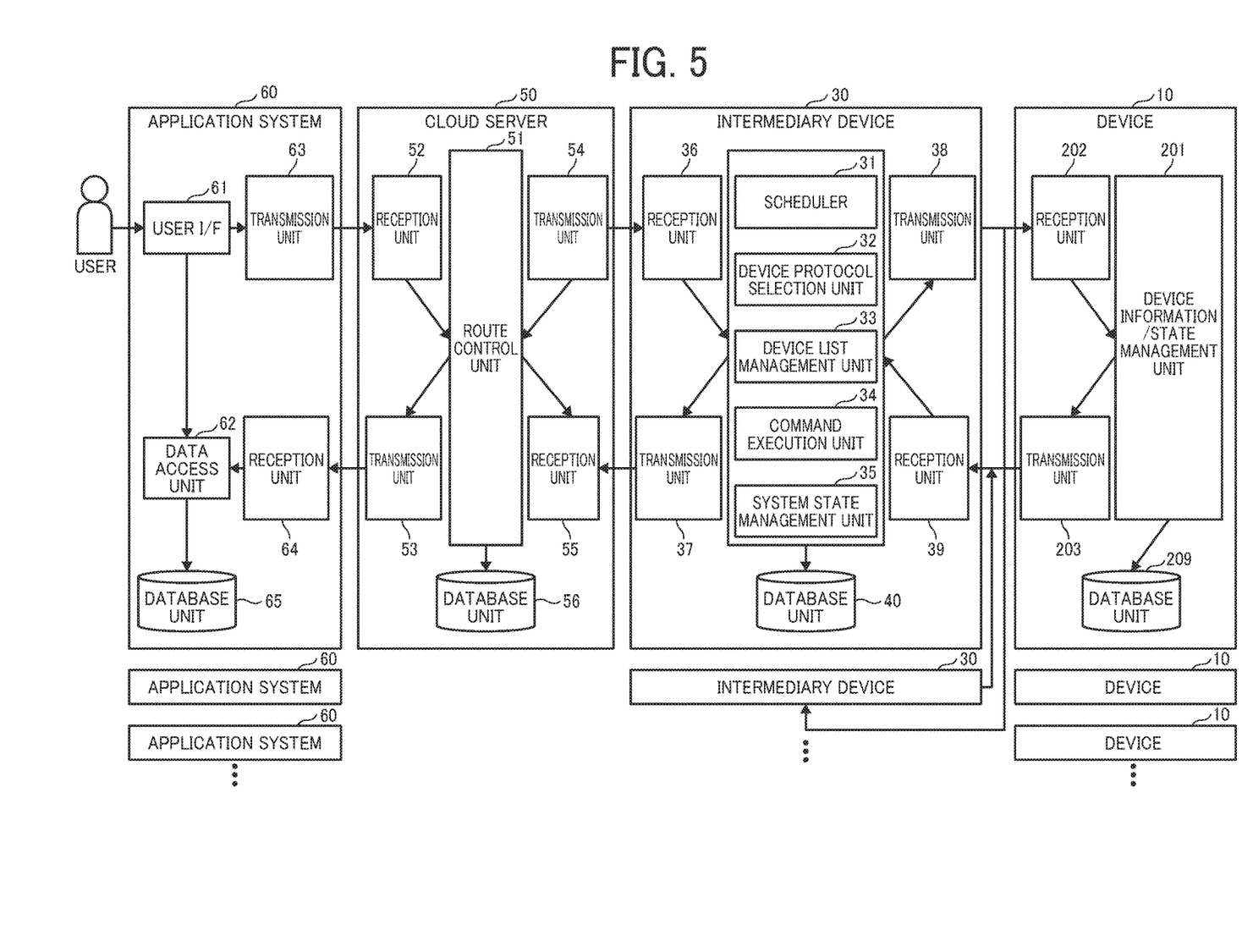
FIG. 5 is an example of a functional block diagram illustrating in blocks the functions of an application system, a cloud server, an intermediary device, and a device incorporated in a device monitoring system.

FIG. 5 is an example of a functional block diagram illustrating in blocks the functions of the application system 60, the cloud server 50, the intermediary device 30, and the device 10 incorporated in the device monitoring system 100.

<<Application System>>

The application system 60 includes a user I/F 61, a data access unit 62, a transmission unit 63, a reception unit 64, and a database unit 65. Each of the functions of the application system 60 is a function or means realized as the CPU 101 executes a program developed in the memory 102 from the storage device 103 illustrated in FIG. 3. Note that this program may be distributed from a server for program distribution, or distributed in a state of being stored in a portable storage medium such as a USB memory or an optical storage medium.

The user I/F 61 provides the state and information regarding the device 10 to be monitored and the intermediary device 30 to a terminal device (browser software) used by the user. The user I/F 61 includes, for example, the function of a Web server, and provides the user with screen information written in HTML or the like. Also, the user I/F 61 displays a list of the statuses and information regarding the device 10 to be monitored and the intermediary device 30. Further, in accordance with an operation to confirm the details by the user, the user I/F 61 provides a screen including buttons to order information acquisition and control to the device 10.

The data access unit 62 retrieves and processes persistent device information and the like from the database unit 65, and provides the device information to the user's terminal device via the user I/F 61. In addition, the data access unit 62 saves a notification from the cloud server 50 in the database unit 65. Further, when a trouble of service provided by the application system 60 is detected, the data access unit 62 also retrieves information on target of notification (i.e., a notification destination) from the database unit 65.

The transmission unit 63 receives a request from the user, and transfers the request to the cloud server 50. Destinations that are assumed are three, that is, the destination may be the cloud server 50, the intermediary device 30, or the device 10. The purpose of transmission is, for example, acquisition of information and execution of control. The reception unit 64 receives the notification from the cloud server 50. The cloud server 50, the intermediary device 30, and the device 10 may be the source elements of transmission. The information that is received is, for example, device information, abnormality notification, a result of control, and the like.

The database unit 65 stores not only the user information, but also destination information representing a target to which a trouble should be reported when a trouble of the service (device) provided by the application system 60 is detected TABLE 1 (a)

| User ID | Password | Account ID |
|---------|----------|------------|
| U001 | **** | A001 |
| U002 | **** | A002 |
| ... | ... | ... |

TABLE 1 (b)

| Identification Information of Device or Intermediary Device | Telephone Number | Mail Address |
|---|---|---|
| kiki001 | 03-1234-xxxx | service01@company.com |
| kiki002 | 03-2345-xxxx | service02@company.com |
| cyukai001 | 03-3456-xxxx | service03@company.com |
| ... | ... | ... |

Table 1 (a) schematically illustrates information managed by the user information. In the user information, a user ID, a password, and an account ID are registered to be associated with each other. The user ID is identification information for specifying or identifying the user from the application system 60. Since the user in the above is intended as a person who uses the application system 60, a customer engineer or the like is imagined as the user in this case rather than a general user. A password is information kept confidential for validating the user. The account ID is identification information for specifying or identifying the user from the cloud server 50.

Table 1 (b) schematically illustrates information managed by the destination information. In the destination information, identification information of the device 10 or the intermediary device 30, a telephone number, and a mail address are registered in association with each other. The identification information of the device 10 and the intermediary device 30 is information for identifying the device 10 related to the application system 60, and for identifying the intermediary device 30 mediating the device information of the device 10. The telephone number and the mail address are information used to contact a person (for example, a customer engineer) when an abnormality has occurred in the device 10 or the intermediary device 30.

The functions of the application system 60 illustrated in FIG. 5 are merely the main functions described in the present embodiment. That is, in addition to the functions illustrated in FIG. 5, the application system 60 may include a report aggregation function, a data analysis function, display means, or the like, specialized for each application system 60.

Further, the information illustrated in Table 1 can be at least changed at arbitrary timing by the user on the application system 60, and may further be added or deleted.

<<Cloud Server>>

The cloud server 50 includes a route control unit 51, two reception units, i.e., reception units 52 and 55, and two transmission units, i.e., transmission units 53 and 54. Each of the functions of the cloud server 50 is a function or means realized as the CPU 101 executes a program developed in the memory 102 from the storage device 103 illustrated in FIG. 3. Note that this program may be distributed from a server for program distribution, or distributed in a state of being stored in a portable storage medium such as a USB memory or an optical storage medium.

The route control unit 51 uses associations stored in a database unit 56, more specifically, the association between the user's account and the application system 60, the association between the application system 60 and the intermediary device 30, and the association between the intermediary device 30 and the device 10. By using these associations, the route control unit 51 distributes a request from the application system 60 to an appropriate intermediary device 30 or device 10 according to the specifics of the request from the application system 60. The route control unit 51 similarly distributes a notification from the device 10 or the intermediary device 30 to an appropriate application system 60. The route control unit 51 also adds or deletes information related to the above.

The transmission unit 53 transmits a notification to the application system 60, and the transmission unit 54 transmits a request to the device 10 or the intermediary device 30. The reception unit 52 receives a request from the application system 60, and the reception unit 55 receives a notification from the device 10 or the intermediary device 30.

The database unit 56 stores information necessary for associating the user's account with the application system 60, associating the application system 60 with the intermediary device 30, and associating the intermediary device 30 with the device 10.

TABLE 2 (a)

| Account ID | Application System |
|---|---|
| A001 | Application System A |
| A002 | Application System B |
| . . . | . . . |

TABLE 2 (b)

| Application System | Intermediary Device ID |
|---|---|
| Application A | cyukai001 |
| Application B | cyukai010 |
| . . . | . . . |

TABLE 2 (c)

| Intermediary Device ID | Device ID |
|---|---|
| cyukai001 | kiki001 |
|  | kiki002 |
| cyukai010 | Kiki011 |
| . . . | . . . |

Table 2 (a) illustrates an example of association between the user's account and the application system 60. In Table 2 (a), the account ID and the application system 60 are associated with each other. Table 2 (b) illustrates an example of association between the application system 60 and the intermediary device 30. In Table 2 (b), the application system 60 and an intermediary device ID are associated with each other. Table 2 (c) illustrates an example of association between the intermediary device 30 and the device 10. In Table 2 (c), the intermediary device ID and a device ID are associated with each other. Therefore, when the user logs into the application system 60 and causes the application system 60 to transmit a request to the cloud server 50, the intermediary device ID and the device ID are specified, and the user can communicate with the intermediary device 30 or the device 10. Conversely, when a notification is issued from the intermediary device 30 to the cloud server 50, the device 10, the application system 60, and the account (user) can be specified.

The information illustrated in Table 2 can be at least changed at an arbitrary timing by the user via the application system 60 and the cloud server 50, and may further be added or deleted.

<<Intermediary Device>>

The intermediary device 30 includes a scheduler 31, a device protocol selection unit 32, a device list management unit 33, a command execution unit 34, a system state management unit 35, two transmission units, i.e., transmission units 37 and 38, two reception units, i.e., reception units 36 and 39, and a database unit 40. Each of the functions of the intermediary device 30 is a function implemented by the CPU 101 that executes a program developed in the memory 102 from the storage device 103 illustrated in FIG. 3. Note that this program may be distributed from a server for program distribution, or distributed in a state of being stored in a portable storage medium such as a USB memory or an optical storage medium.

The scheduler 31 acquires the device information from the device 10 to be monitored, on the basis of schedule information set in advance by an internal clock of the intermediary device 30, and notifies the cloud server 50 of the device information. Also, the scheduler 31 performs a periodic operation such as checking whether network communication of the device 10 is enabled (i.e., communication confirmation or active/inactive monitoring). In the present embodiment, in addition to the above, monitoring of the intermediary device 30, such as state acquisition or abnormality detection of the intermediary device 30, is performed regularly. In the case of state acquisition, pull communication which pulls the state from the other intermediary device 30 is carried out. The abnormality detection is executed by push communication which pushes processing to the other intermediary device 30. The push communication corresponds to a communication mode in which information is transmitted to apparatus B before apparatus A makes a request, and the pull communication corresponds to a communication mode in which information is transmitted to apparatus B when apparatus A makes the request. For the state acquisition, pull communication is reliable since the state acquisition is performed periodically and is performed from a normal intermediary device. Meanwhile, for the state notification, push communication is appropriate since prompt response is desired to be made at a timing of abnormality. By employing two types of communication together, an advantage of being able to receive both merits can be brought about.

After taking over the device monitoring of the intermediary device 30 in which abnormality has occurred, the scheduler 31 further acquires device information from the device 10 which the abnormal intermediary device 30 has monitored.

Figure 6A:
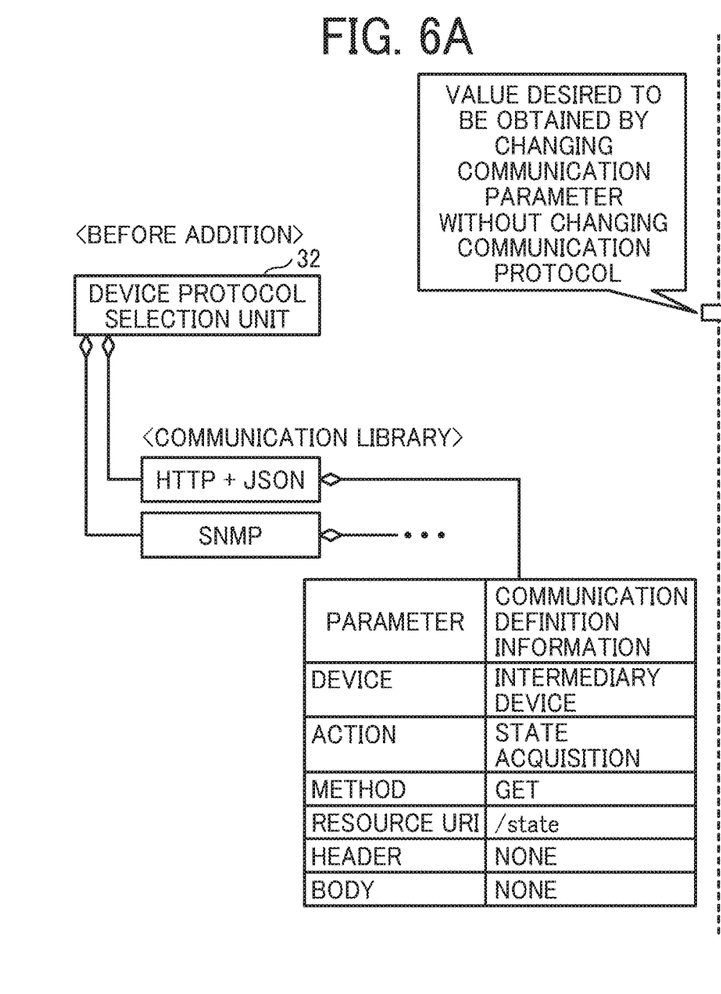
FIGS. 6A and 6B are examples of a view for explaining a device connection definition stored in a database unit.
Figure 6B:
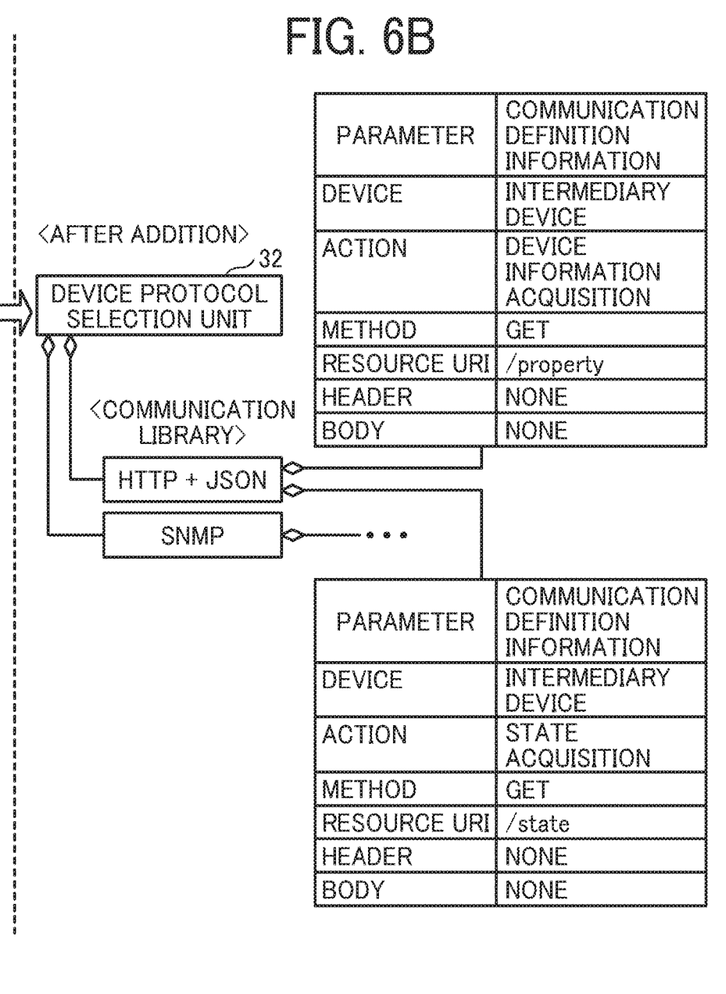

The device protocol selection unit 32 manages, in the database unit 40, communication parameters for executing acquisition of the device information, search, communication confirmation, and the like. The communication parameter to be managed is referred to as a device connection definition. Details are illustrated in FIGS. 6A and 6B. When a device 10 to be monitored is added, a communication parameter is also newly set. When the device 10 to be monitored is deleted, the communication parameter is also deleted.

As the communication protocols, HTTP, Simple Network Management Protocol (SNMP), ICMP (Ping), etc., are used. However, the communication protocols are not limited to the above. For example, as regards the HTTP, a resource URI, a method, a header-query-body parameter are employed as the communication parameters. Also, as regards the SNMP, a command class (Get/GetBulk), a version, a community name, and an object identifier (OID) are employed. Also for the communication protocol between the intermediary devices 30, the communication parameter is managed by the device protocol selection unit 32.

The device list management unit 33 manages the device ID for communicating with the device 10, a device type, and an IP address of the device 10 in the database unit 40. The intermediary device 30 is also managed as one of the devices 10 by the device list management unit 33.

The command execution unit 34 interprets the contents of the request from the cloud server 50, and executes control of the device 10 according to the request. The system state management unit 35 detects a system abnormal state such as insufficient memory, disk shortage, and a disk write error, notifies the cloud server 50 of the abnormality, and automatically restores the device 10. Also, similar state management is performed for the other intermediary devices 30, and recovery processing and notification processing are performed according to the abnormal level.

Communication is controlled in such a way that the transmission unit 38 transmits a request from the cloud server 50 to the device 10, and the transmission unit 37 transmits an abnormality notification from the device 10 to the cloud server 50. As a method of communication, Hypertext Transfer Protocol Secure (HTTPS) or the like can be used, but the method of communication is not limited to HTTPS as long as communication can be established.

Communication is controlled in such a way that the reception unit 36 receives a request from the cloud server 50, and the reception unit 39 receives the abnormality notification from the device 10. While HTTPS can be used as the means for communication, the communication means is not limited to HTTPS as long as communication can be established.

The database unit 40 stores, in a persistent manner, setting information such as information on the device 10 managed by the intermediary device 30, processing performed when the intermediary device 30 is abnormal, correspondence between the state and level of the intermediary device 30, handover items when an abnormality occurs in the intermediary device 30 itself, and communication parameters (FIGS. 6A and 6B) for communicating with the device 10.

TABLE 3 (a)

| Device to be monitored | |
|---|---|
| Device ID | kiki0 |
| Device type | MFP |
| IP address | 192.168.0.1 |
| Monitoring item | State of resident threads |
| | Memory usage |
| | Disk usage |
| | Time limit of certification |
| | Communication queue |
| | State of regular session |

TABLE 3 (b)

| Abnormal level | Processing |
|---|---|
| Level 1 | Follow-up observation |
| Level 2 | Recovery processing |
| | (Notify when not recovered) |
| Level 3 | Immediate notification |

Table 3 (c)

| | |
|---|---|
| Level 1 | Insufficient memory: 70% or more |
| | Disk shortage: 70% or more |
| | Communication abnormality: Network environment deficiency |
| | Communication information queue full: Within allowed time |
| Level 2 | Insufficient memory: 90% or more |
| | Disk shortage: 90% or more |
| | Communication abnormality: Time limit expired, etc. |
| | Internal abnormality of being unable to continue processing: Restoration possible by reboot |
| | Internal abnormality of being able to continue processing: Restoration possible by reboot |
| | DB access abnormality: Reimporting of set values |
| | Communication information queue full: Allowed time over |
| Level 3 (On-site handling required) | Internal abnormality of being unable to continue processing: Restoration impossible by reboot, Log collection |
| | Communication abnormality: Cable slip-out |

TABLE 3 (d)

| Device information to be transmitted to cloud server continuously | |
|---|---|
| Device ID | kiki003 |
| Monitoring item | State of resident threads |
| | Memory/usage |
| | Disk usage |

Table 3 (a) schematically illustrates information on the device 10 managed by the intermediary device 30. As illustrated in Table 3 (a), as the information, a device ID of the device 10 to be monitored, a device type, an IP address, monitoring items, and the like, are stored. Therefore, the intermediary device 30 can acquire the device information corresponding to the monitoring item, on the basis of the device ID and the IP address. The settings as illustrated in Table 3 (a) are registered in the other devices 10, and the other intermediary device 30 monitored by the intermediary device 30.

The monitoring items can be changed by the user from the application system 60. For example, by selecting necessary monitoring items from the state of the resident threads, memory usage, disk usage, a time limit of certification, communication queue, state of regular session, and the like, communication overhead can be reduced. Moreover, since unnecessary information is reduced, the information is easier to see.

Table 3 (b) illustrates an example of processing performed when the intermediary device 30 is abnormal. In Table 3 (b), the abnormal level is classified into three levels, and the degree of abnormality becomes high in the order of level 1, level 2, and level 3 (level 1<level 2<level 3). Classification of three levels is merely an example. In the case of level 1, follow-up observation is performed. Meanwhile, in the case of level 2, recovery processing (reboot, etc.) is performed, and when the intermediary device 30 is unrecoverable, the situation is reported to the cloud server 50. In the case of level 3, the situation is reported to the cloud server 50 immediately. Also for the device 10, processing performed when abnormality occurs as illustrated in Table 3 (b) is set. Appropriate response can be made by judging the abnormal level. Further, the relationship between the abnormal level and the processing can be changed from the application system. Thus, flexible handling is possible in accordance with the individual operation of the device and the intermediary device.

Table 3 (c) is a table for explaining the correspondence between the state of the intermediary device 30 and the abnormality level. As illustrated in Table 3 (c), the setting is made to determine a level from levels 1 to 3 according to the state of the intermediary device 30. The setting in Table 3 (c) is an example, and may differ according to each intermediary device 30 or device 10.

Table 3 (d) illustrates an example of handover items when an abnormality occurs in the actuating intermediary device itself. When an abnormality occurs in the intermediary device 30 corresponding to the actuating device, a load of the intermediary device 30 monitoring the intermediary device 30 in which the abnormality has occurred is increased due to the handover. Therefore, at least the device information, which is the information on the device to be monitored, is set even after the monitoring has been handed over, so that the load of the intermediary device 30 that took over the state monitoring of the device 10 is not increased excessively. The device information acquired from the device 10 by the intermediary device 30 assigned to take over the position is equal to or less than the device information which has been acquired from the device 10 by the abnormal intermediary device 30 before taking over. By doing so, the load of a substitute intermediary device can be reduced.

The information illustrated in Tables 3 (a) to (d) can be at least changed at an arbitrary timing by the user via the application system 60 and the cloud server 50, and may further be added or deleted.

<<Device>>

The device 10 includes a device information/state management unit 201, a database unit 209, a reception unit 202, and a transmission unit 203. Each of the functions of the device 10 is a function or means realized as the CPU 11 executes a program developed in the RAM 12b from the HDD 19 illustrated in FIG. 4. Note that this program may be distributed from a server for program distribution, or distributed in a state of being stored in a portable storage medium such as a USB memory or an optical storage medium.

The device information/state management unit 201 performs control of responsively transmitting the device information of the device 10, in response to a request from the intermediary device 30. Meanwhile, the device information/state management unit 201 performs control of transmitting a notification, such as abnormality detection triggered by the device 10, to the intermediary device 30.

The reception unit 202 receives a request from the intermediary device 30. The transmission unit 203 transmits a notification from the device 10 to the intermediary device 30. The database unit 209 stores, in a persistent manner, information related to the settings of the device 10 and state values.

The functions of the device 10 illustrated are merely the main functions, and the functions that are not directly relevant are not disclosed in the present specification. For example, when the device 10 is a multifunction peripheral, the device 10 includes the functions of a printer, a copier, a scanner, a facsimile, and the like.

<Device Connection Definition>

FIGS. 6A and 6B are examples of a view for explaining a device connection definition stored in the database unit 40. The device connection definition is information defining a communication protocol by which the intermediary device 30 can communicate with the other intermediary device 30 or device 10. FIGS. 6A and 6B illustrate an example of a communication protocol between the intermediary device 30 and another intermediary device 30.

FIG. 6A illustrates that two communication protocols, i.e., HTTP and SNMP, are adoptable, as the communication protocol based on which the intermediary device 30 can communicate with the other intermediary device 30. In addition, a body part when HTTP is used is registered as JSON.

In HTTP communication, parameters, such as a method, a resource URI, a header, and a body, need to be specified. Thus, these parameters are set in FIG. 6A. FIG. 6A indicates the parameter of a case where the intermediary device 30 acquires the state (state acquisition: (GET/state) from the other intermediary device 30.

In FIG. 6A, the method is GET, the resource is/state (relative path), the device is the intermediary device 30, and the action is state acquisition. While the HTTP request includes an HTTP request row, an HTTP header, and a data body (Body), in FIG. 6A, the header and the body being unnecessary is registered. Therefore, the device protocol selection unit 32 creates only the request row.

FIG. 6B illustrates an example in which a parameter of "GET/property" by which the intermediary device 30 acquires device information from the other intermediary device 30 is added, in addition to the parameter of "GET/state" by which the intermediary device 30 acquires the state from the other intermediary device 30.

As described above, because the communication protocol and parameters are set for each device 10 and intermediary device 30, when an abnormality occurs in the intermediary device 30, the intermediary device 30 that took over the mediation of the device information can communicate with the device 10.

The device connection definition may be set for each intermediary device 30 or device 10 by specifying the ID.

Such addition of communication parameters can be performed by the application system 60. By enabling addition of the communication parameters by a command from the application system 60, the device connection definition can be easily extended without updating the firmware of the intermediary device 30. The communication parameters may also be deleted or changed as a matter of course.

That is, when the intermediary device 30 acquires logs of various devices 10, the acquisition is possible by merely setting the communication parameters described above without updating the firmware.

<Operation Procedure>

Figure 7:
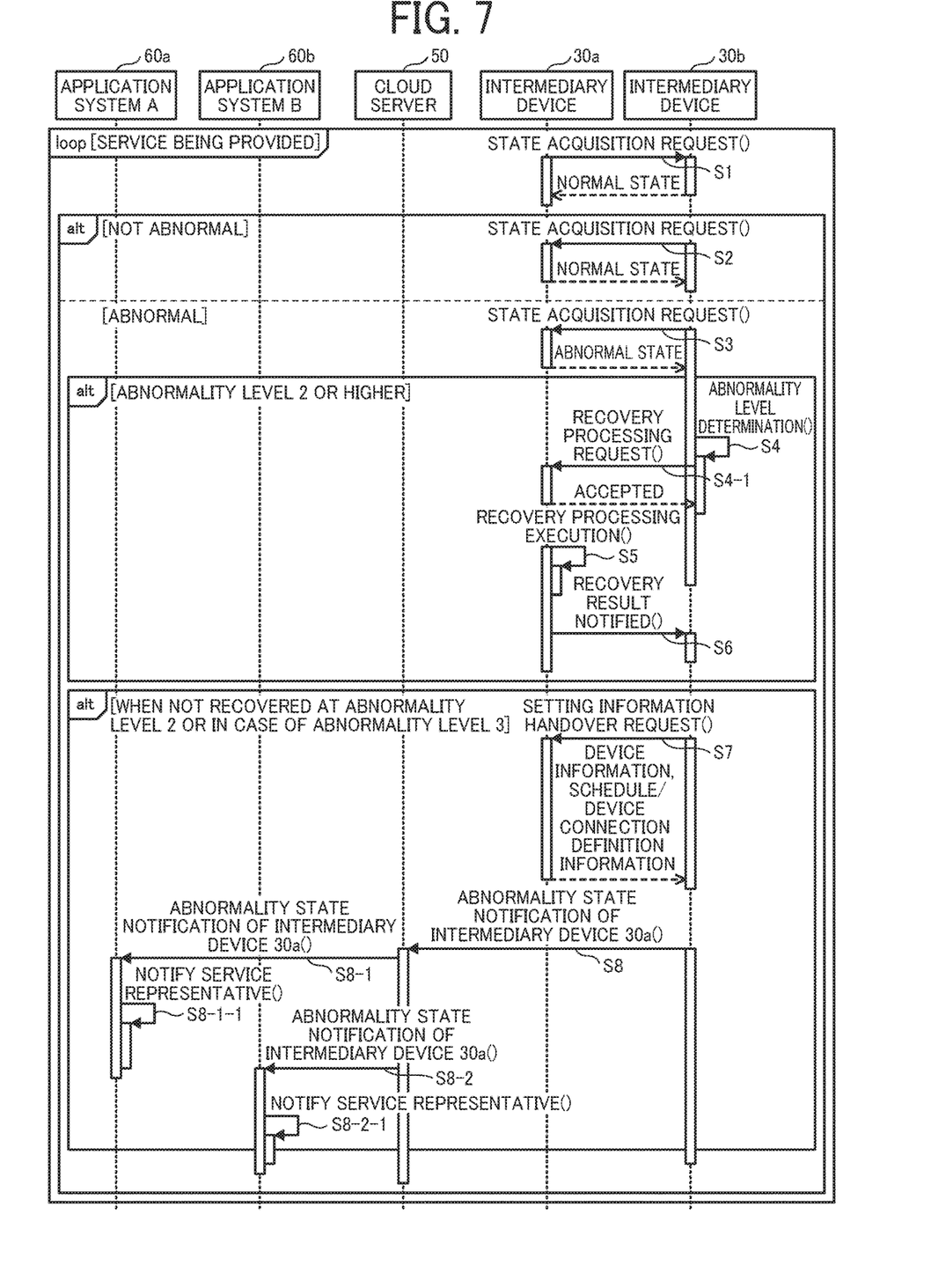
FIG. 7 is an example of a sequence diagram representing a procedure in which the intermediary device monitors another intermediary device in the device monitoring system.

FIG. 7 is an example of a sequence diagram representing a procedure in which the intermediary device 30 monitors the other intermediary device 30 in the device monitoring system 100.

S1: The scheduler 31 of the intermediary device 30a periodically monitors the state of the intermediary device 30b, for example. The system state management unit 35 of the intermediary device 30b notifies the intermediary device 30a of the state information determined as representing a normal state.

S2: The scheduler 31 of the intermediary device 30b periodically monitors the state of the intermediary device 30a, for example. The system state management unit 35 of the intermediary device 30a notifies the intermediary device 30b of the state information determined as representing a normal state.

The communication in steps S1 and S2 is communication for mutually monitoring the states of the respective intermediary devices 30. The communication may be push communication or pull communication.

An example of the item to be monitored by the state acquisition (the state of the intermediary device) is as follows:

Activation state of resident threads;
Memory usage; —Disk usage;
Time limit of certification;
Usage of communication information queue; and
Connection state of regular session.

S3: The scheduler 31 of the intermediary device 30b periodically monitors the state of the intermediary device 30a, for example. It is assumed that the system state management unit 35 of the intermediary device 30a notifies the intermediary device 30b of the state information determined as representing an abnormal state.

S4: The system state management unit 35 of the intermediary device 30a determines the level of abnormality according to a value obtained by the state acquisition. It is assumed that the user can change the criteria for determining the level of abnormality by setting via the application system 60. For example, whether it should be determined that the state is abnormal when the memory usage rate is 80% or more, or when the memory usage rate is 90% or more can be changed by the setting. Also, the abnormal level is judged in three levels (follow-up observation, recovery processing required, recovery processing impossible). An example of variations of the abnormal level is indicated in Table 3 (c).

S4-1: When the abnormal level corresponds to the follow-up observation, the system state management unit 35 of the intermediary device 30b does not particularly take any action. In a case where recovery processing is necessary, the system state management unit 35 of the intermediary device 30b transmits a recovery processing request such as a reboot to the intermediary device 30a. If the intermediary device 30a is recovered, a customer engineer is saved the trouble of going on site, and so the cost is saved.

When the intermediary device 30a has automatically restored itself, the monitoring intermediary device 30b is informed of the restoration to prevent recovery processing from being performed redundantly. When the recovery processing is not performed by the intermediary device 30a itself, (i.e., when no notification is issued from the intermediary device 30a), the system state management unit 35 of the intermediary device 30b transmits a recovery processing request to the intermediary device 30a in the abnormal state.

Also, preferably, the system state management unit 35 of the intermediary device 30b should consider the service level of the intermediary device 30a. The service level is a degree of the processing load. In other words, when the service level of the intermediary device 30a is low (below a certain level), recovery processing is requested to see whether the intermediary device 30a returns to the normal state. As a result, the recovery processing can be performed for the intermediary device 30a when the intermediary device 30a is not performing a job such as printing, or when the entered jobs are few. Thus, a loss of jobs is easily suppressed.

S5: The system state management unit 35 of the intermediary device 30a in the abnormal state attempts to perform the recovery processing when the request is received.

S6: The transmission unit 38 of the intermediary device 30a notifies the intermediary device 30b, which requested the recovery processing, of a result of the recovery processing.

S7: If the intermediary device 30a is not restored by the recovery processing, the system state management unit 35 of the intermediary device 30b transmits a setting information handover request to the intermediary device 30a. Consequently, the intermediary device 30b can acquire the information of the device 10 illustrated in Table 3 (a), the handover items when an abnormality occurs in the actuating device itself illustrated in Table 3 (d), and the connection definition information indicated in FIGS. 6A and 6B. Furthermore, a schedule should preferably be acquired. As a result of taking over of the setting information, the upper limit of the number of devices 10 that can be monitored by the intermediary device 30b may be exceeded. However, such a temporary excess is permitted due to an emergency situation. If the setting information can be taken over only partially, it is not possible to provide service. However, if the temporary excess is permitted, the processing of the intermediary device 30 in the abnormal state can be completely substituted.

Although not clear from FIG. 7, the scheduler 31 of the intermediary device 30b takes over the monitoring of the device 10 that has been monitored by the intermediary device 30a, based on the information of the device 10 illustrated in Table 3 (a), the handover items illustrated in Table 3 (d), and the connection definition information. That is, communication with the device 10 is executed by the communication protocol and parameters necessary for communication with the device 10 set in the connection definition information.

Instead of taking over the setting information after the abnormality is detected as in step S7, setting information may be acquired in advance by making a setting information handover request in advance (during mutual monitoring). In other words, the taking over of the setting information may be carried out before or after the occurrence of abnormality.

S8: The system state management unit 35 of the intermediary device 30b that took over the setting information notifies the cloud server 50 of the fact that the intermediary device 30a is in an abnormal state via the transmission unit 37.

S8-1: The reception unit 55 of the cloud server 50 receives the abnormality notification of the intermediary device 30a, and the route control unit 51 transfers the abnormality notification to the application system 60 associated with the intermediary device 30a illustrated in Table 2 (b).

S8-1-1: The reception unit 64 of the application system 60 receives the abnormality notification, and the data access unit 62 performs the processing of reporting to a service representative by referring to a reporting destination from the destination information in the database unit 65 registered in advance. Consequently, on-site handling can be performed.

S8-2 and S8-2-1: The specifics of the processing are the same as the processing of S8-1 and S8-1-1. In this manner, the cloud server 50 can notify a plurality of application systems 60 simultaneously (in parallel). In other words, a plurality of application systems 60 for notifying the abnormal state can be set in the route control unit 51 of the cloud server 50 in advance.

In this embodiment, the order of processing of the recovery processing request in step S4-1 and the setting information handover request in step S7 can be switched. If taking over is performed in advance, the processing may be wasted when the intermediary device 30a is recovered by the recovery process. However, the service reliability is improved when the intermediary device 30b is unable to acquire the setting information from the intermediary device 30 in case of a trouble. Meanwhile, if the recovery processing is performed in advance, the intermediary device 30a is temporarily stopped. However, assuming that the recovery processing is performed promptly and the intermediary device 30a is recovered, such a procedure has an advantage of not needing to make an unnecessary setting information handover request.

<Other Devices to be Managed>

In the present embodiment, the multifunction peripheral has been described as an example of a device to be managed. However, the device to be managed, which is a target of management, may be a medical imaging camera in the field of medicine, a machine tool in the field of industrial machine, or the like.

Figure 8:
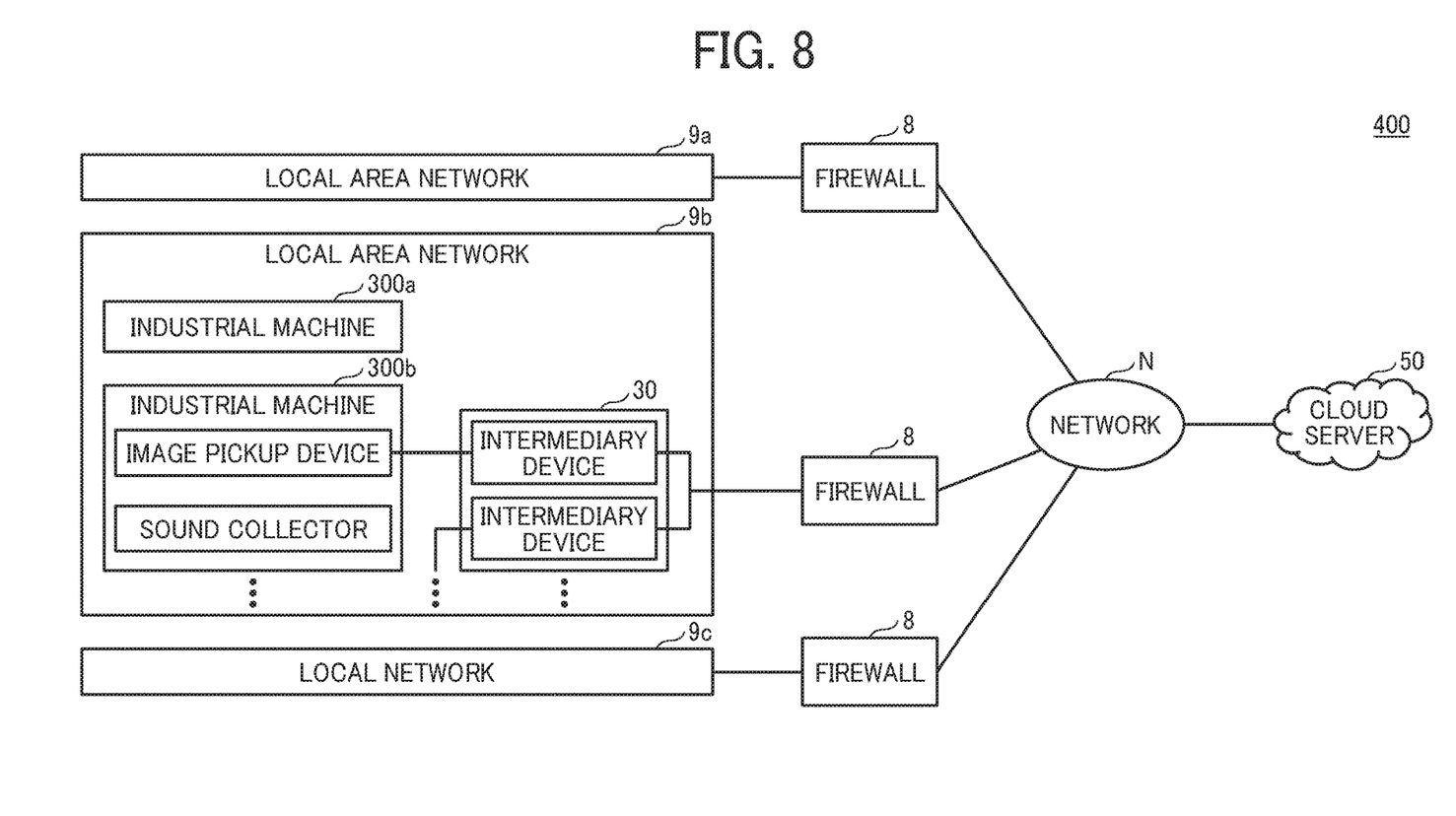
FIG. 8 is a block diagram representing a configuration example of an industrial machine management system.

FIG. 8 is a block diagram representing a configuration example of an industrial machine management system 400 according to the present embodiment. The industrial machine management system 400 includes a plurality of industrial machines 300a to be remotely controlled, sensors 300b (an image pickup device and a sound collector), the intermediary device 30 connected to the same LAN 9 as the devices 10 (machines 300a and the sensors 300b), and a cloud server 50 connected to the intermediary device 30 via the firewall 8 and the network N. The cloud server 50 is to remotely manage the device 10 connected on the same LAN 9 as the intermediary device 30 via the network N. The sensor 300b such as the image pickup device or the sound collector is attached to the industrial machine 300a itself or around the industrial machine 300a, and is configured to acquire information of the industrial machine 300a.

Here, a case where a plurality of firewalls 8 and cloud servers 50 are installed may be considered. In addition, a case where a plurality of intermediary devices 30 are installed in a single firewall 8 may be considered.

As described above, the device to be managed in the device monitoring system 100 is not limited to a multifunction peripheral. That is, the device to be managed may be a device such as a network home appliance, a vending machine, a medical device, an industrial machine, a power supply device, an air conditioning system, or a device equipped with a communication function in a metering system for gas, water, electricity, etc. For example, the industrial machines include a processing device, an inspection device, a carrier device, a picking device, and the like. Further, the industrial machine may be an image pickup device or a sound collector installed in the vicinity of the aforementioned devices to grasp the state of the respective devices. The industrial machine transmits, to a management device, identification information of the device, an operational status of the device, whether or not an abnormal operation occurred, information related to replacement timing of consumables, a result of inspection by the device, and the like. The above is transmitted by using various kinds of information transmission means, in other words, in the form of data or image, for example.

Examples of the medical device include a fundus examination device, an X-ray testing device, a blood-pressure meter, a body fat scale, an optometer, a pacemaker, and the like. The medical device transmits, to the management device, identification information of the device, an operational status of the device, whether or not an abnormal operation occurred, a result of measurement by the device, and the like. The above is transmitted by using various kinds of information transmission means, more specifically, in the form of data or image, for example.

As explained above, in the device monitoring system 100 of the present embodiment, when the intermediary device 30 is stopped, another intermediary device 30 takes over the intermediary position. Thus, stability and availability of communication between the device 10 and the cloud server 50 can be improved.

Although the best mode for carrying out the present invention has been described by way of examples, the present invention is in no way limited to the described examples, and various modifications and replacement may be made without departing from the spirit of the present invention.

For example, in the above embodiment, two intermediary devices 30 are provided in a single LAN 9. However, three or more intermediary devices may exist in a single LAN 9. In the above case, three or more intermediary devices may monitor each other in a beaded manner, or a single intermediary device 30 may monitor two intermediary devices.

In the above embodiment, two intermediary devices 30 in a single LAN monitor each other. Alternatively, two intermediary devices may monitor each other across different LANs.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An intermediary device for mediating communication between a server and a device, the intermediary device comprising circuitry configured to:

transmit, to the server, device information on the device to be monitored acquired from the device via a network;

monitor a state of another intermediary device, the another intermediary device being configured to acquire from another device to be monitored device information on the another device and transmit the acquired device information to the server; and take over monitoring of the another device, which the another intermediary device kept monitoring, based on setting information for monitoring the another device monitored by the another intermediary device, when the state of the another intermediary device indicates that the another intermediary device has an abnormality, wherein the circuitry determines an abnormality level of the another intermediary device from the state of the another intermediary device, and performs recovery processing of the another intermediary device according to the abnormality level and a current processing level of the another intermediary device.

2. The intermediary device according to claim 1, wherein when the abnormality level of the another intermediary device is at least a predetermined level, the circuitry performs processing of recovering the another intermediary device from the abnormality.

3. The intermediary device according to claim 2, wherein the circuitry is configured to:
acquire information indicating the state from the another intermediary device by pull communication; and
perform processing of recovering the another intermediary device from the abnormality by push communication.

4. The intermediary device according to claim 1, further comprising:
a memory that stores the abnormality level of the another intermediary device in association with processing according to the abnormality level, the processing according to the abnormality level being changeable from external resources,
wherein the circuitry performs, as the processing of recovering, processing associated with the determined abnormality level.

5. The intermediary device according to claim 1, wherein:
the setting information sets device information on the another device, which is to be transmitted to the server as a result of the taking over when an abnormality occurs in the another intermediary device,
the setting information being changeable from external resources.

6. The intermediary device according to claim 1, wherein the circuitry is configured to:
manage, as the setting information, a communication protocol for enabling communication with the device, and a parameter set by the communication protocol; and
acquire the setting information, before or after occurrence of the abnormality in the another intermediary device, to acquire device information from the device that the another intermediary device kept monitoring using the communication protocol for enabling communication with the device that the another intermediary device monitored, and the parameter.

7. The intermediary device according to claim 6, wherein the communication protocol and the parameter are addable, changeable, or deletable from external resources.

8. A device monitoring system comprising:
a plurality of devices to be monitored, including at least one first device and at least one second device;
a first intermediary device configured to transmit, to a server, device information on the first device acquired from the first device; and
a second intermediary device configured to transmit, to the server, device information on the second device acquired from the second device,
each of the first intermediary device and the second intermediary device comprising circuitry configured to:
monitor a state of other intermediary device; and
take over monitoring of the device, which the other intermediary device kept monitoring, based on setting information for monitoring the device monitored by the other intermediary device, when a state of the other intermediary device indicates that the other intermediary device has an abnormality, wherein the circuitry of the first intermediary device determines an abnormality level of the second intermediary device from the state of the second intermediary device, and performs recovery processing of the second intermediary device according to the abnormality level and a current processing level of the second intermediary device.

9. An intermediation method performed by an intermediary device for mediating communication between a server and a device, the method comprising:
transmitting, to the server, device information on the device to be monitored acquired from the device via a network;
monitoring a state of another intermediary device, the another intermediary device being configured to acquire from another device to be monitored device information on the another device and transmit the acquired device information to the server;
taking over monitoring of the another device, which the another intermediary device kept monitoring, based on setting information for monitoring the another device monitored by the another intermediary device, when the state of the another intermediary device indicates that the another intermediary device has an abnormality; and
determining an abnormality level of the another intermediary device from the state of the another intermediary device, and performs recovery processing of the another intermediary device according to the abnormality level and a current processing level of the another intermediary device.

10. The intermediation method according to claim 9, further comprising:
determining an abnormality level of the another intermediary device from the state of the another intermediary device; and
performing processing according to the abnormality level.

11. The intermediation method according to claim 10, wherein, when the determining determines that the abnormality level of the another intermediary device is at least a predetermined level, the performing processing includes recovering the another intermediary device from the abnormality.

12. The intermediation method according to claim 10, further comprising:
associating the abnormality level of the another intermediary device and processing according to the abnormality level with each other, the processing according to the abnormality level being changeable from external resources,
wherein the performing processing of recovering includes performing processing associated with the determined abnormality level.

13. The intermediation method according to claim 9, further comprising:
setting device information on the another device, which is to be transmitted to the server as a result of the taking over when an abnormality occurs in the another intermediary device, as the setting information,
the setting information being changeable from external resources.

14. The intermediation method according to claim 9, further comprising:
managing, as the setting information, a communication protocol for enabling communication with the device, and a parameter set by the communication protocol; and
acquiring the setting information, before or after occurrence of the abnormality in the another intermediary device, to acquire device information from the device that the another intermediary device kept monitoring using the communication protocol for enabling communication with the device that the another intermediary device monitored, and the parameter.

\* \* \* \* \*